United States Patent
Werson et al.

(10) Patent No.: US 6,844,646 B1
(45) Date of Patent: Jan. 18, 2005

(54) ELECTRIC MOTOR

(75) Inventors: Michael John Werson, Eastleigh (GB); Brian Cleaver, Tamworth (GB)

(73) Assignee: Automotive Motion Technology Limited, Andover (GB)

( * ) Notice: Subject to any disclaimer, the term of this patent is extended or adjusted under 35 U.S.C. 154(b) by 0 days.

(21) Appl. No.: 10/672,930

(22) Filed: Sep. 25, 2003

(30) Foreign Application Priority Data

Sep. 27, 2002 (GB) .............................................. 0222394

(51) Int. Cl.[7] .............................................. H02K 21/12
(52) U.S. Cl. .............................. 310/156.16; 310/156.19
(58) Field of Search ...................... 310/156.16, 156.17, 310/156.19, 156.24, 156.26, 156.12, 156.13, 154.03, 154.08, 154.12, 154.14, 154.17

(56) References Cited

U.S. PATENT DOCUMENTS

| | | | | | |
|---|---|---|---|---|---|
| 3,663,850 A | * | 5/1972 | Phelon | ........................ | 310/153 |
| 4,012,651 A | * | 3/1977 | Burson | ........................ | 310/153 |
| 4,219,752 A | * | 8/1980 | Katou | ................... | 310/156.19 |
| 4,412,145 A | * | 10/1983 | Voss et al. | ............. | 310/154.15 |
| 4,636,107 A | * | 1/1987 | Casler et al. | ................ | 411/477 |
| 4,859,892 A | * | 8/1989 | Shiroyama | ................... | 310/218 |
| 6,376,956 B1 | * | 4/2002 | Hosoya | ................. | 310/154.17 |

FOREIGN PATENT DOCUMENTS

| | | |
|---|---|---|
| DE | 3726413 A1 | 2/1989 |
| GB | 2 120 356 A | 11/1983 |
| GB | 2 123 318 A | 2/1984 |
| JP | 61-42251 | 2/1986 |

* cited by examiner

*Primary Examiner*—Dang Le
(74) *Attorney, Agent, or Firm*—Dykema Gossett PLLC

(57) ABSTRACT

An electric motor including a rotor with a generally cylindrical rotor wall and a plurality of magnetic field producing elements mounted on an inside surface of the rotor wall, the rotor being mounted for rotation around a central stator, wherein the magnetic field producing elements are mounted on the rotor wall by means of a plurality of resilient retaining members, at least one resilient retaining member being located between and engaging with edges of two adjacent magnetic field producing elements, the edges of the magnetic field producing elements extending generally parallel to an axis of rotation of the rotor, the resilient retaining member being elastically deformed so as to exert a retaining force on the magnetic field producing elements.

8 Claims, 2 Drawing Sheets

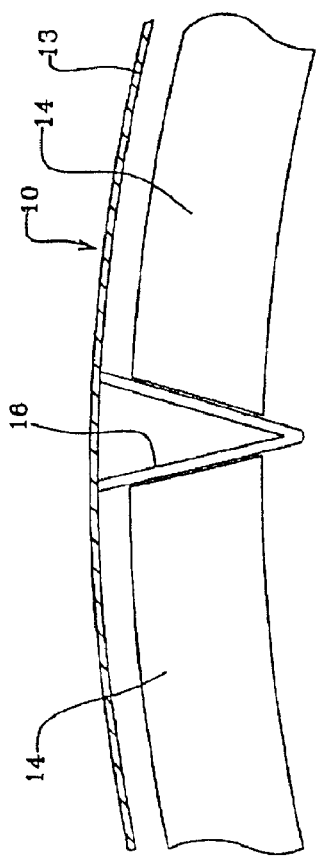
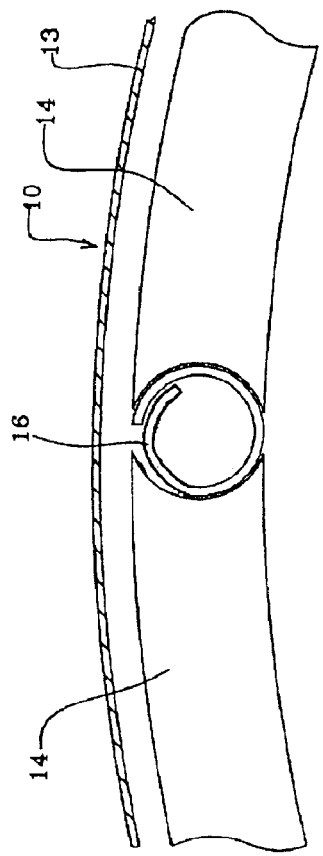

ELECTRIC MOTOR

This application claims priority to United Kingdom Patent Application No. 0222394.9 filed Sep. 27, 2002, the entire disclosure of which is incorporated herein by reference.

FIELD OF THE INVENTION

The present invention relates to an electric motor, in particular to means of mounting magnetic field producing elements on an external rotor of an electric motor.

DESCRIPTION OF PRIOR ART

It is known to attach magnetic field producing elements such as permanent magnets to the inside of a cylindrical wall of a motor rotor by means of generally T-shaped bars. A head of each bar engages with an edge of the magnet whilst a stem of each bar is attached to the rotor wall, for example by welding. As each bar has to be individually connected to the rotor wall, the process of attaching the magnets to the rotor is time consuming and hence expensive. Moreover, care must be taken during assembly to ensure that no movement of the magnets with respect to the rotor is permitted.

A further disadvantage of rotors assembled in this way is that when used in an electrically commutated motor such as a brushless DC motor, the torque exerted on the rotor as a result of the magnetic field generated by coils in the stator pulses. As a result, the rotor tends to vibrate whilst rotating and vibration pulses are set-up. This causes the motor to be undesirably noisy, and is a particular problem when the motor is used in applications in which the rotor rotates at relatively high speeds, for example when the motor is used to drive a steering pump.

SUMMARY OF THE INVENTION

According to a first aspect of the invention, we provide an electric motor including a rotor with a generally cylindrical rotor wall and a plurality of magnetic field producing elements mounted on an inside surface of the rotor wall, the rotor being mounted for rotation around a central stator, wherein the magnetic field producing elements are mounted on the rotor wall by means of a plurality of resilient retaining members, at least one resilient retaining member being located between and engaging with edges of two adjacent magnetic field producing elements, the edges of the magnetic field producing elements extending generally parallel to an axis of rotation of the rotor, the resilient retaining members being elastically deformed so as to exert a retaining force on the magnetic field producing elements.

Thus, by virtue of the invention, there is no need to weld or otherwise attach a retaining bar to the rotor wall, and thus the magnets may quickly and easily be mounted on the rotor wall.

The electric motor is preferably an electrically commutated motor such as a brushless DC motor.

It has been found that, by virtue of the fact that such retaining members permit some movement of the magnets relative to each other and to the rotor wall, any vibration pulses, such as those produced due to torque pulses produced in an electrically commutated motor, tend to be damped, and thus a motor having a rotor according to the first aspect of the invention tends to be less noisy in use than comparable prior art electric motors.

Preferably, the magnetic field producing elements are permanent magnets.

Preferably, the edges of the magnetic field producing elements are shaped to conform to the shape of the resilient retaining member, as this permits a greater area of the edges of the elements to engage with the retaining member, and hence may further assist in retaining the magnetic field producing elements on the rotor wall.

Each resilient retaining member may include a first and a second portion each with a first edge and an opposite second edge, the two portions being joined along their first edges and inclined relative to one another at an angle of between 0 and 90°. In this case, each resilient retaining member is preferably arranged with the second edges of the first and second portions directly adjacent to the rotor wall, and the first portion engaging with a first magnetic field producing element and the second portion engaging with a second adjacent magnetic field producing element.

Alternatively, each resilient retaining member may be a roll-pin.

Preferably, the magnetic field producing elements are elongate and arranged with their longitudinal axes generally parallel to the axis of rotation of the rotor wall, in which case, each resilient retaining member is preferably elongate and is preferably arranged with its longitudinal axis generally parallel to the longitudinal axes of the magnetic field producing elements. In addition, each resilient retaining member preferably extends along substantially the entire length of the magnetic field producing elements.

According to a second aspect of the invention we provide a method of assembling a rotor for an electric motor, the rotor being adapted in use to rotate about an axis of rotation, the method including the steps of positioning two magnetic field producing elements against an inside surface of a cylindrical wall of the rotor, inserting a resilient retaining member between edges of the two magnetic field producing elements which extend generally parallel to the axis of rotation of the rotor, the resilient retaining member being elastically deformed during insertion such that once in place it exerts a retaining force on the magnets.

DESCRIPTION OF THE DRAWINGS

The invention will now be described by way of example only with reference and/or as shown in the accompanying drawings of which, FIG. 3 is an illustration of part of a cross-section through a second embodiment of rotor for an electric motor according to the invention, FIG. 4 is an illustration of part of a cross-section through a third embodiment of rotor for an electric motor according to the invention.

DESCRIPTION OF THE PREFERRED EMBODIMENTS OF THE INVENTION

Figure 1:
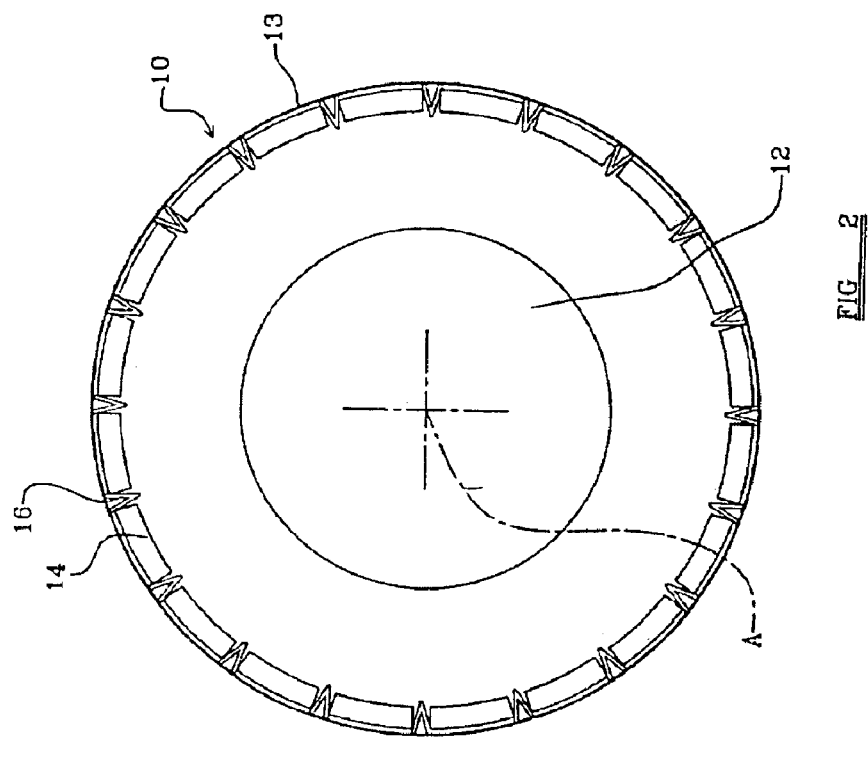
FIG. 1 is an illustration of a cross-section through a rotor and stator of a prior art electric motor.

Referring now to the drawings there is shown a rotor 10 and a stator 12 for an electric motor, preferably for an electrically commutated motor such as a brushless DC motor. Both the rotor 10 and stator 12 are generally cylindrical, and the rotor 10 is arranged concentrically around the stator 12.

The rotor 10 includes a generally cylindrical rotor wall 13, which is mounted for rotation about its longitudinal axis A by conventional means (not shown), and a plurality of magnetic field producing elements 14, which in this example are permanent magnets 14, mounted around the entire circumference and on an inside surface of the rotor wall 13. Each magnet 14 is an elongate and is arranged with its longitudinal axis parallel to the longitudinal axis. A of the rotor 10. The transverse cross-section of each magnet 14 has the shape of a segment of an annulus, and thus each magnet 14 has two opposite curved faces and two opposite planar edges.

In the prior art arrangement, the magnets 14 are mounted on the rotor wall 13 by means of a plurality of retaining bars 16'. Each retaining bar 16' has a T-shaped transverse cross-section, and has a stem 16'a which extends between two adjacent magnets 14 radially inwardly of the rotor wall 13, and a head 16'b which engages with a top surface of an edge of each magnet to retain the magnets 14 with respect to the rotor wall 13.

The stem 16'a of each retaining bar 16' is attached to the rotor wall 13 by welding or other such method, and therefore attaching the retaining bars 16' on the rotor wall 13 is time consuming. Moreover, care must be taken when attaching the retaining bars 16' to the rotor wall 13, to ensure that the retaining bars 16' clamp down on the magnets tightly enough completely to prevent movement of the magnets 14 with respect to the rotor wall 13. In addition, when in use in an electrically commutated motor such as a brushless DC motor, pulses in the torque exerted on the rotor 10 by coils within the stator 12 cause the rotor 10 to vibrate and vibration pulses to be set up, which significantly increases the noise generated by the electric motor.

Figure 2:
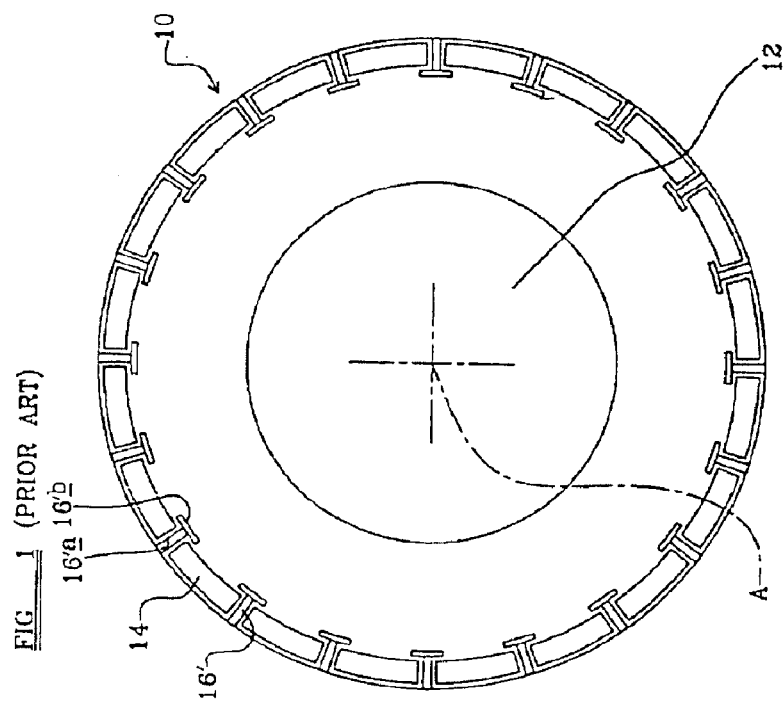
FIG. 2 is an illustration of a cross-section through rotor and stator of an electric motor according to the invention.

Referring now to FIGS. 2 to 4, according to the invention, however, the magnets 14 are mounted on the rotor wall 13 by means of a plurality of resilient retaining members 16, there being at least one retaining member 16 between each pair of adjacent magnets. Each retaining member 16 is elastically deformed so as to exert a retaining force on the magnets 14.

In the embodiments shown in FIGS. 2 and 3, each retaining member 16 is an elongate element with a V-shaped transverse cross-section. Thus, each retaining member 16 has a first and a second portion each with a first edge and an opposite second edge, the two portions being joined along their first edges and inclined relative to one another, in this example at an angle of approximately 30° although another angle between 0° and 90° may be adopted. The retaining members 16 are made from a material such as spring steel.

Each retaining member 16 is arranged between two adjacent magnets 14 with a longitudinal axis generally parallel to the longitudinal axis A of the rotor wall 13, with the second edges of the first and second portions adjacent to the rotor wall 13, and the first portion engaging with the edge of one magnet 14 and the second portion engaging with the edge of the adjacent magnet 14. In this example, each retaining member 16 extends along substantially the entire length of the magnets 14.

The size and number of magnets 14 are such that the gap between adjacent magnets is too small to receive the retaining member 16 without the retaining member 16 being elastically deformed to bring the first and second portions closer together. Thus, the retaining members 16 are deformed prior to or during insertion between the magnets 14, and then released when in place between adjacent magnets, whereupon they expand such that the first and second portions of the retaining member 16 push outwardly against the magnets 14 and hence exert a retaining force on the magnets 14. When all the magnets 14 and retaining members 16 are in place, this retaining force is sufficient to retain the magnets 14 in position around the rotor wall 13.

As it is not necessary to attach each retaining member 16 to the rotor wall 13, mounting of the magnets 14 on the rotor wall 16 is considerably simplified over the prior art arrangement described above. Moreover, it has been found that, as some limited movement of the magnets 14 relative to each other and to the rotor wall 13 is permitted, any vibration pulses are damped, and hence a electrically commutated motor according to the invention, tends to be quieter than a prior art arrangement.

In order to increase the area of contact between each retaining member 16 and the adjacent magnets 14, it is possible to shape the edges of the magnets 14 to conform with the shape of retaining members 16. This may assist in retaining the magnets 14 against the rotor wall 13.

For example, as shown in FIG. 3, the edges of the magnets 14 may be inclined so that they do not lie radially with respect to the rotor wall 13, but instead lie substantially parallel to the first and second portions of the retaining members 16.

The retaining members 16 also need not have a V-shaped cross-section, and any similar spring arrangement may be used instead. For example, the retaining members 16 may be a roll-pin as shown in FIG. 4.

In the example shown in FIG. 4, the edges of the magnets 14 are each provided with a generally semi-circular recess which is adapted to receive part of a retaining member 16. This is not, however, necessary, and magnets 14 of the configurations shown in FIGS. 2 and 3 may be used with a retaining member 16 having a generally circular cross-section.

Whilst in the above examples, each retaining member 16 extends along substantially the entire length of the magnets 14, the retaining members 16 may be shorter than the magnets 14, provided they supply sufficient retaining force to retain the magnets 14 on the rotor wall 13. Alternatively, if desired, two or more short retaining members 16 may be provided between each pair of adjacent magnets 14.

The magnetic field producing elements 14 need not be permanent magnets. They may instead include an element which can be induced to produce a magnetic field, such as a magnetizable element or electrically conducting coil, in which case, the rotor 10 may be used in a switched reluctance motor.

The rotor wall 13 typically is made from sheet metal, but may instead be made from a composite material comprising a viscoelastic material sandwiched between two sheets of metal. Such a material is commercially available under the name BONDAL®. The use of such a material is particularly advantageous in an electric motor according to the invention, as it further reduces the vibration noise produced by the rotor 10 when in use. It is believed that the frequency of vibrations generated by movement of the magnets 14 and the frequency of vibrations generated by the composite rotor wall 13 are such that the vibrations at least partially cancel each other out, and hence the noise produced by the motor when in use is further reduced.

The invention is particularly useful when the motor is used in applications in which the rotor must rotate relatively fast, for example when the motor is used to drive a steering pump in a motor vehicle.

What is claimed is:

1. An electric motor including a rotor with a generally cylindrical rotor wall and a plurality of magnetic field producing elements mounted on an inside surface of the rotor wall, the rotor being mounted for rotation around a central stator, wherein the magnetic field producing elements are mounted on the rotor wall by means of a plurality of resilient retaining members, at least one resilient retaining member being located between and engaging with edges of two adjacent magnetic field producing elements, said edges of the magnetic field producing elements extending generally parallel to an axis of rotation of the rotor, the resilient retaining member being elastically deformed so as to exert a retaining force on the magnetic field producing elements, wherein each resilient retaining member includes a first and a second portion each with a first edge and an opposite second edge, the first and second portions being joined along their first edges and inclined relative to one another at an angle of between 0 and 90°, and the edges of the magnetic field producing elements are inclined to conform to the shape of the resilient retaining member.

2. An electric motor according to claim 1 wherein the motor is an electrically commutated motor.

3. An electric motor according to claim 1 wherein the magnetic field producing elements are permanent magnets.

4. An electric motor according to claim 1 wherein each resilient retaining member is arranged with the second edges of the first and second portions directly adjacent to the rotor wall, and the first portion engaging with a first magnetic field producing element and the second portion engaging with a second adjacent magnetic field producing element.

5. An electric motor according to claim 1 wherein the magnetic field producing elements are elongate and arranged with their longitudinal axes generally parallel to the axis of rotation of the rotor wall.

6. An electric motor according to claim 5 wherein each resilient retaining member is elongate and is arranged with its longitudinal axis generally parallel to the longitudinal axes of the magnetic field producing elements.

7. An electric motor according to claim 6 wherein each resilient retaining member extends along substantially the entire length of the magnetic field producing elements.

8. A method of assembling a rotor for an electric motor, the rotor being adapted in use to rotate about an axis of rotation, the method including the steps of positioning two magnetic field producing elements against an inside surface of a cylindrical wall of the rotor, inserting a resilient retaining member between edges of the two magnetic field producing elements which extend generally parallel to the axis of rotation of the rotor, the resilient retaining member being elastically deformed during insertion such that once in place it exerts a retaining force on the magnetic field producing elements, wherein the resilient retaining member includes a first and a second portion each with a first edge and an opposite second edge, the first and second portions being joined along their first edges and inclined relative to one another at an angle of between 0 and 90°, and the edges of the two magnetic field producing elements are inclined to conform to the shape of the resilient retaining member.

* * * * *